United States Patent
Naderer et al.

(10) Patent No.: US 10,005,182 B2
(45) Date of Patent: Jun. 26, 2018

(54) ROBOT ARM

(71) Applicant: FerRobotics Compliant Robot Technology GmbH, Linz (AT)

(72) Inventors: Ronald Naderer, Sankt Florian (AT); Paolo Ferrara, Kematen an der Krems (AT)

(73) Assignee: FerRobotics Compliant Robot Technology GmbH, Linz (AT)

( * ) Notice: Subject to any disclaimer, the term of this patent is extended or adjusted under 35 U.S.C. 154(b) by 44 days.

(21) Appl. No.: 15/037,194

(22) PCT Filed: Nov. 18, 2014

(86) PCT No.: PCT/AT2014/050275
§ 371 (c)(1),
(2) Date: May 17, 2016

(87) PCT Pub. No.: WO2015/074089
PCT Pub. Date: May 28, 2015

(65) Prior Publication Data
US 2016/0288325 A1  Oct. 6, 2016

(30) Foreign Application Priority Data

Nov. 19, 2013  (DE) .................. 10 2013 223 603

(51) Int. Cl.
| G05B 19/04 | (2006.01) |
| G05B 19/18 | (2006.01) |
| B25J 9/16 | (2006.01) |

(52) U.S. Cl.
CPC ........... *B25J 9/1633* (2013.01); *B25J 9/1641* (2013.01); *G05B 2219/39186* (2013.01);
(Continued)

(58) Field of Classification Search
CPC .................. B25J 9/1633; B25J 9/1641; G05B 2219/39186; G05B 2219/39197; G05B 2219/39342; G05B 2219/39345
See application file for complete search history.

(56) References Cited

U.S. PATENT DOCUMENTS 4,628,910 A * 12/1986 Krukowski ........ A63B 21/0058
482/5
4,806,066 A * 2/1989 Rhodes .................... B25J 9/046
254/286
(Continued)

FOREIGN PATENT DOCUMENTS

| DE | 10255950 A1 | 6/2004 |
| DE | 102011009669 A1 | 12/2011 |

(Continued)

OTHER PUBLICATIONS

Huang, Yuancan et al., "Integrated Rotary Compliant Joint and Its Impedance-based Controller for Single-Joint Pressing Massage Robot", 2012 IEEE International Conference on Robotics and Biomimetics (ROBIO), Guangzhou, China, Dec. 2012, pp. 1962-1967.
(Continued)

*Primary Examiner* — Khoi H Tran
*Assistant Examiner* — Jorge O Peche
(74) *Attorney, Agent, or Firm* — Murphy, Bilak & Homiller, PLLC

(57) ABSTRACT

A robot includes a yielding element for mechanically coupling first and second arm segments of a robot arm. A motor moves the second arm segment relative to the first arm segment. A sensor determines a relative position of the first arm segment in relation to the second arm segment and outputs a position sensor signal representing the relative position. A control unit controls the motor in accordance with the position sensor signal such that the first arm
(Continued)

segment is moved into a desired relative position in relation to the second arm segment, when no external force is applied to the robot arm, and when an external force is applied to the robot arm, the motor generates a counterforce which depends on the deviation between the actual and desired positions. The control unit has a predetermined time constant so that changes in the external force are substantially absorbed by damping elements.

12 Claims, 5 Drawing Sheets

(52) U.S. Cl.
CPC .............. *G05B 2219/39197* (2013.01); *G05B 2219/39342* (2013.01); *G05B 2219/39345* (2013.01)

(56) References Cited

U.S. PATENT DOCUMENTS

| | | | | |
|---|---|---|---|---|
| 6,385,508 | B1* | 5/2002 | McGee | B25J 9/0081 |
| | | | | 285/189 |
| 8,402,911 | B1* | 3/2013 | Weisenberg | F16L 55/265 |
| | | | | 104/138.2 |
| 9,592,608 | B1* | 3/2017 | Bingham | B25J 9/1674 |
| 2005/0246061 | A1* | 11/2005 | Oaki | B25J 9/1692 |
| | | | | 700/245 |
| 2006/0293617 | A1* | 12/2006 | Einav | A61H 1/0274 |
| | | | | 601/33 |
| 2007/0282228 | A1* | 12/2007 | Einav | A61B 34/30 |
| | | | | 601/33 |
| 2011/0275480 | A1* | 11/2011 | Champsaur | A63B 21/0058 |
| | | | | 482/4 |
| 2012/0312114 | A1 | 12/2012 | Deegan | |
| 2013/0013108 | A1* | 1/2013 | Jacobsen | B25J 3/04 |
| | | | | 700/250 |
| 2013/0211595 | A1* | 8/2013 | Takagi | B25J 9/1633 |
| | | | | 700/261 |
| 2015/0248121 | A1* | 9/2015 | Nilsson | B25J 9/1641 |
| | | | | 318/569 |
| 2016/0184032 | A1* | 6/2016 | Romo | A61B 10/04 |
| | | | | 606/130 |
| 2016/0375577 | A1* | 12/2016 | Louveau | B25J 3/04 |
| | | | | 700/260 |
| 2017/0014290 | A1* | 1/2017 | Tsusaka | A61G 7/10 |
| 2017/0157778 | A1* | 6/2017 | Lee | B25J 9/1633 |
| 2017/0165834 | A1* | 6/2017 | Hares | B25J 9/1641 |

FOREIGN PATENT DOCUMENTS

| | | | | |
|---|---|---|---|---|
| DE | 102011084007 A1 | | 4/2012 | |
| DE | 102013223603 | * | 5/2015 | ............ B25J 9/1633 |
| DE | 102013223603 A1 | * | 5/2015 | ............ B25J 9/1633 |

OTHER PUBLICATIONS

Morita, Toshio et al., "Development of One-D.O.F. Robot Arm equipped with Mechanical Impedance Adjuster", Proceedings of the 1995 IEEE/RSJ International Conference on Intelligent Robots and Systems, Human Robot Interaction and Cooperative Robots, vol. 1, pp. 407-412.

Quigley, Morgan et al., "A Low-cost Compliant 7-DOF Robotic Manipulator", 2011 IEEE International Conference on Robotics and Automation (ICRA), pp. 6051-6058.

Vanderborght, B. et al., "Variable impedance actuators: A review", Robotics and Autonomous Systems, vol. 61, No. 12, 2013, pp. 1601-1614.

Yoon, S.S. et al., "Safe Arm with MR-based Passive Compliant Joints and Visco-elastic Covering for Service Robot Applications", Proceedings of the 2003 IEEE/RSJ International Conference on Intelligent Robots and Systems, Oct. 2003, (IROS 2003), vol. 3, pp. 2191-2196.

* cited by examiner

ROBOT ARM

TECHNICAL FIELD

The embodiments described herein relate to the field of robotics, particularly to a robot arm that is driven by electric actuators.

BACKGROUND

Robots and particularly robot arms may be employed in numerous areas, in private homes as well as in industry and medicine. Traditionally, robots are built to be rigid and thus may cause harm or damage by applying comparably high forces or upon collision when moving at high speeds. Thus there is a general need for an improved robot arm, that is able to "intelligently" react on forces externally applied to the robot arm.

SUMMARY

In accordance with one exemplary embodiment, the robot arm comprises the following: A first arm segment and a second arm segment; a motor that is configured to move one of the arm segments; a spring-damper element that is configured to mechanically couple the first arm segment and the second arm segment; at least one sensor that is configured to detect a relative position of the first arm segment in relation to the second arm segment and to output a sensor signal that represents this relative position, and a control unit that is configured to receive the sensor signal and to control the motor in dependence on the sensor signal.

The control unit is further configured to control the motor so that the arm is moved into a desired position provided no external force is applied to the robot arm. If an external force is applied to the robot arm, the control unit measures this force (disturbing force), whereby the latter is dependent on the deviation of the actual current position and the desired position. Various reactions to this disturbing force are possible. The control unit can compensate the disturbing force (by generating a corresponding counter force) or the arm can counteract the disturbing force with the least possible resistance (theoretically zero). These two possibilities will be explained in greater detail further below.

In the process, the robot arm combines a passive yielding capacity, achieved by means of the spring-damper element, with an active yielding capacity, achieved by means of the robot controller. Thus the robot (and with it the load) can respond to an external, slowly applied force in accordance with an adjustable, force-displacement characteristic curve. A rapidly applied external force, e.g. impact (caused, for example, by a collision), can be absorbed by the spring-damper element. The controller can react to the rapid external application of force in accordance with another control principle. For example, one (or multiple) joints of the robot's arm may be controlled to be "soft". This means that the motor is controlled to only compensate the weight forces and no longer counteracts an externally applied force.

In accordance with another exemplary embodiment, the robot arm comprises a first arm segment and at least one second arm segment, a motor configured to move one of the arm segments, a belt that is configured to mechanically couple the first arm segment with the second arm segment, a spring-damper element that is configured to dampen a movement of the first arm segment in relation to the second arm segment, at least one sensor that is configured to detect a relative position of the first arm segment in relation to the second arm segment and to output a sensor signal that represents this relative position.

Furthermore, a method for controlling a robot arm, which is composed of at least a first arm segment and a second arm segment, is described. In accordance with one exemplary embodiment, the method includes determining a relative position of the first arm segment in relation to the second arm segment and controlling the relative position of the first arm segment in relation to the second arm segment to move the first arm segment into a desired relative position, when no external force is applied to the robot arm, and to generate a counterforce depending on the deviation between an currently determined relative position and a desired relative position, when an external force is applied to the robot arm. The control of the relative position is done with a predetermined time constant, so that changes in the external forces, which are rapid as compared to the time constant, are substantially absorbed by damping elements coupled between the first arm segment and the second arm segment.

BRIEF DESCRIPTION OF THE DRAWINGS

The invention can be better understood with reference to the following description and drawings. The components in the figures are not necessarily to scale, emphasis instead being placed upon illustrating the principles of the invention. Moreover, in the figures, like reference numerals designate corresponding parts. In the drawings.

DETAILED DESCRIPTION

Generally, the embodiments described herein may be used for a large number of various applications. In some embodiments, the robot arm may be used as a therapy apparatus for the passive and active mobilization of a person's limbs. During its therapeutic application, for example, a muscularly flaccid human arm can be moved about by means of the robot arm. Dependent on the actual application, a robot arm designed in accordance with the embodiments described herein may be robust. That is, the robot may be designed to absorb or damp external forces applied to the robot arm (e.g. due to an impact). This may be, inter alia, achieved by the specific technical realization of the drivetrain including electric motors and transmissions, as common electric drives usually lack the capacity to absorb such forces. Another aspect with regard to safety and self-protection is passivity. That is, accordance with the embodiments described herein should exhibit some passive elasticity similar to air muscles. Furthermore, in case of a malfunction that could lead to the system being subject to excessively high forces, all inner resistance may be shut down immediately by safety mechanisms in order to prevent the robot arm from being damaged. One related aspect may be the robot's yielding capacity, i.e. the robot's capability to yield when external forces are applied. Also with regard to active safety (protection of others) the electrically driven robot arm may be configured to be capable of yielding so that no user is harmed by it.

Another aspect in the design of a robot arm in accordance with the embodiments described herein may relate to interaction with objects or humans. The robot arm controller may be configured to be capable of recognizing externally applied forces and the robot may be configured to react to these both passively (by means of its physically yielding structure) as well as actively (by means of controlling the transmissions). In doing so, the actually followed trajectory can deviate from the desired trajectory or alter the originally desired trajectory. To control the robot, the measured or calculated force and position (e.g. angular position of the arm segments) values, as well as the current state of the robot, are available to a robot controller via communication interfaces. Commands for controlling the robot's functioning may also be entered via communication interfaces. The commands may be able to influence the behavior of the robot in real time.

Some further general design aspects may relate to lightweight construction and economic design. Lightweight construction allows for portability and a comfortable usage (e.g. when used in the field of medicine, e.g. for rehabilitation purposes). However, known electric drives have a much higher weight than, for example, drives that employ air muscles.

Figure 1:
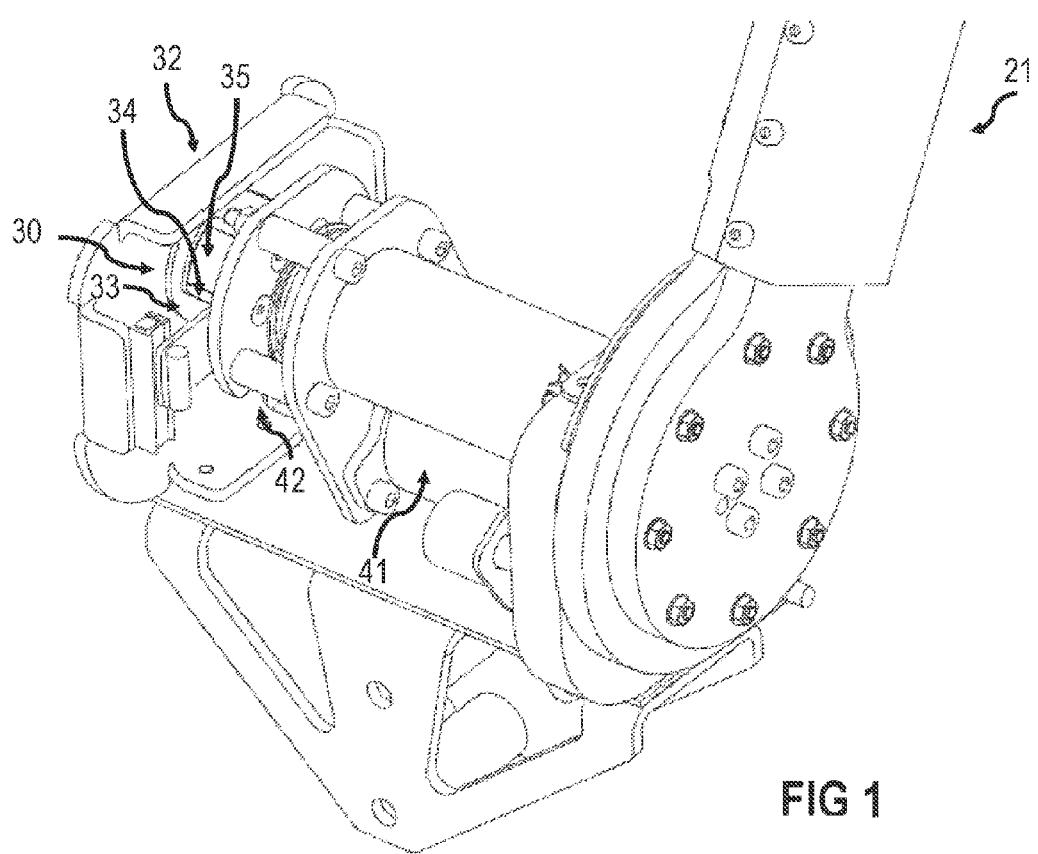
FIG. 1 shows an exemplary embodiment of a robot arm.

FIG. 1 shows an exemplary embodiment of a robot arm. In this exemplary embodiment, a first arm segment 21 and a second arm segment 32 are shown that can be moved in relation to each other by an electric motor 41 by means of a v-belt or timing belt transmission 42. For example, an arm segment (segment 21) can be driven by a motor or moved by an external force (e.g. a human arm during a therapy session). The two arms segments in FIG. 1 form at their joining point a coupling element 30, over which they are rotatable toward each other along one plane. In the exemplary embodiment of FIG. 1, the second arm segment 32 is unswivably connected with a base 22.

As an example, in this case the second arm segment 32 can form the support, on which the robot arm stands. The first arm segment 21 forms, on the other hand, the swivable part of the robot arm. The motor 41 that is arranged on the first arm segment 21 moves, by means of the coupling element 30, the first arm segment 21, which may also be moved by external influences (forces), and while doing so rests on the base 22. The motor 41 is configured such that it can counteract forces externally applied to the first arm segment 21 by generating a slewing resistance (i.e. a torque that counteracts the external forces). The second arm segment 32 is, in the present example, very short and the basis 22 is arranged almost directly on the joint.

The first arm segment 21 has a first coupling element 33 on one end, whereas, analogously, the second arm segment 32 has a second coupling element 35 on its end. The ends of the arm segments are understood to be those parts of the first and second arm segments that are coupled together when the first arm segment 21 is joined with the second arm segment 32 by means of a coupling. Both coupling segments 33, 35 form a coupling element 30. A motor 41 is rigidly arranged on the first arm segment 21 which, for example, is connected by means of a v-belt or belt transmission 42 with one side of the coupling element 30, e.g. with the first coupling element 33. The two coupling elements 33, 35 have a tooth-like design so that they engage each other, transforming a rotation of the one coupling element into a rotation of the corresponding opposing coupling element. The two coupling elements are mechanically coupled with each other by means of a yielding element, also referred to as damping element 34 (to be precise, a spring-damper element). The yielding element 34 allows the two arm segments 21, 32 to tilt within a defined angular range, determined by the construction. This tilt is superimposed onto the rotation of the motor shaft and may also be carried out with the drivetrain being blocked. The yielding element also has a certain material-dependent yielding capacity which can be characterized, for example, by a force-displacement curve (or a torque-angle of rotation curve). Materials that may be considered for the yielding element 34 are, for example, elastomers such as polyurethane (PUR), polyamide (PA), polyether ketones (PEEK) or spring elements embedded in elastomer. In the exemplary embodiment of FIG. 1 the tooth-like coupling elements 33, 35 are designed such that an open space is present between the engaging teeth. This open space is filled by the damping element 34 so that the rotation of the first coupling element 33 is transmitted damped onto the second coupling element 35. The yielding takes place, for example, through deformation, in this exemplary embodiment—squeezing, of the yielding element 34. The damping provided by the damping element 34 takes place up to a certain torque, at which the squeezing reaches it maximum value and the coupling again transmits the torque like a rigid, undamped coupling.

If one arm segment is swiveled, which, due to the construction, for the corresponding coupling segment signifies a rotation around a certain angle, the yielding (damping) element 34 damps the transmission of the torque to the other coupling element until the torque reaches the critical value, beyond which the damping element 34 is maximally deformed (squeezed). Depending on the material structure and the construction, the maximum achievable deformation can be a few Nm (Newton meters) or a few thousand Nm. Exemplary rotation angles, at which damping takes place, are damped in the range of −5° to +5° (total 10°) or in the range of −7.5° to +7.5° (total 15°). In this way, the system is given a certain yielding capacity, which is particularly desirable when the robot arm is used for therapeutic purposes. A conventional coupling of two arm segments, one of which is coupled with a motor, essentially exhibits a rigid behavior of the swivel arms when the drive is turned off. The goal, however, is to provide to the user a certain yielding capacity that allows for small movements. In addition, a selective yielding capacity is desired, one that not only principally yields slightly, but that also allows for an intelligent controlling of the drive. Such controlling is important when the system is required to quickly shut off all resistance to an externally applied force (e.g. in the case of spasms in the arm of the user). For this purpose, the coupling element 30 has a sensor element 50 in addition to the coupling segments 33, 35 (not shown in FIG. 1), which may comprise one or more (individual) sensors, whereby, e.g. a first sensor 51 is rigidly connected with the first coupling segment 33 and a second sensor 52 is rigidly connected with the second coupling segment 35. The sensor element 50 is configured to detect a relative position of the first arm segment 21 in relation to the second arm segment 32 and to output a signal representing this relative position. The robot arm additionally comprises a control unit for processing the sensor signal (not shown) which is configured to receive and process the sensor signal output by the sensor element and to control the motor 41 in dependence on the sensor signal. For example, the strength of such an external force applied to the first arm segment 21 can be calculated on the basis of deformation characteristic curves of the employed damping material (force-deflection curves, torque-angle curves) using the relative rotation of the sensor elements 51, 52, and thus of the coupling segments 33, 35 over the applied torque. The first component of the selective yielding capacity of the robot arm is thus the measurement of the force applied to the robot arm, i.e. the corresponding torque applied to the coupling and thus to the electric motor. A second component of the selective yielding capacity is, in addition to the above mentioned strength of the applied force, its velocity, i.e. the speed with which a force is externally applied to the robot arm. In order to determine the velocity of the applied force, the control unit is configured to calculate the time derivative of the relative position of the first arm segment 21 in relation to the second arm segment 32. In addition, the effective force in the joint (or the torque) may, for example, be measured by means of a load cell, and the controller may also calculate the strength of externally applied force from this. The velocity of the applied force can be determined based on the measured data and the force may thus be classified as a (disturbing) force that is rapidly or slowly applied to the robot arm. In combination with the determination of the force strength a conclusion may thus be drawn as to whether the user has applied a force in a very short period of time which, for example, is the case when a human arm spasmodically contracts during a therapy session. In such a case the control unit can switch the joint, i.e. the motor 41 to run completely "soft", or to even turn in the opposing direction to the deforming forces, before the damping element 35 reaches its deformation limit, thus virtually eliminating all resistance and excluding any potential danger to the user. If the force applied to the coupling, on the other hand, increases slowly, then the control unit can keep the transmission and the motor 41 rigid and adapt the resistance accordingly. Switching a joint (or the entire robot) to run "soft" (yielding) means that the controller switches to a modus, in which the drive in the corresponding joint is adjusted to compensate the weight forces of the robot but not to react any further to a disturbance caused by externally applied force (a deviation from the desired position). A robot arm with a joint controlled in this manner yields to every externally applied force and remains stationary as soon as no force (other than the weight force) is externally applied to the robot arm.

It should be mentioned here that the effective force in the joint (i.e. the torque) is not interpreted as being entirely a "disturbing force". First of all, the torque is used to move the robot arm itself (i.e. to accelerate it) or to keep the arm's weight statically in place. If the applied torque contains a portion that extends beyond those needs, then that portion is interpreted to be disturbing force (i.e. the externally applied force), in response to which the selective yielding capacity is controlled.

It should be understood that any desired number of arm segments with coupling elements may be joined together in accordance with the exemplary embodiment.

Figure 2:
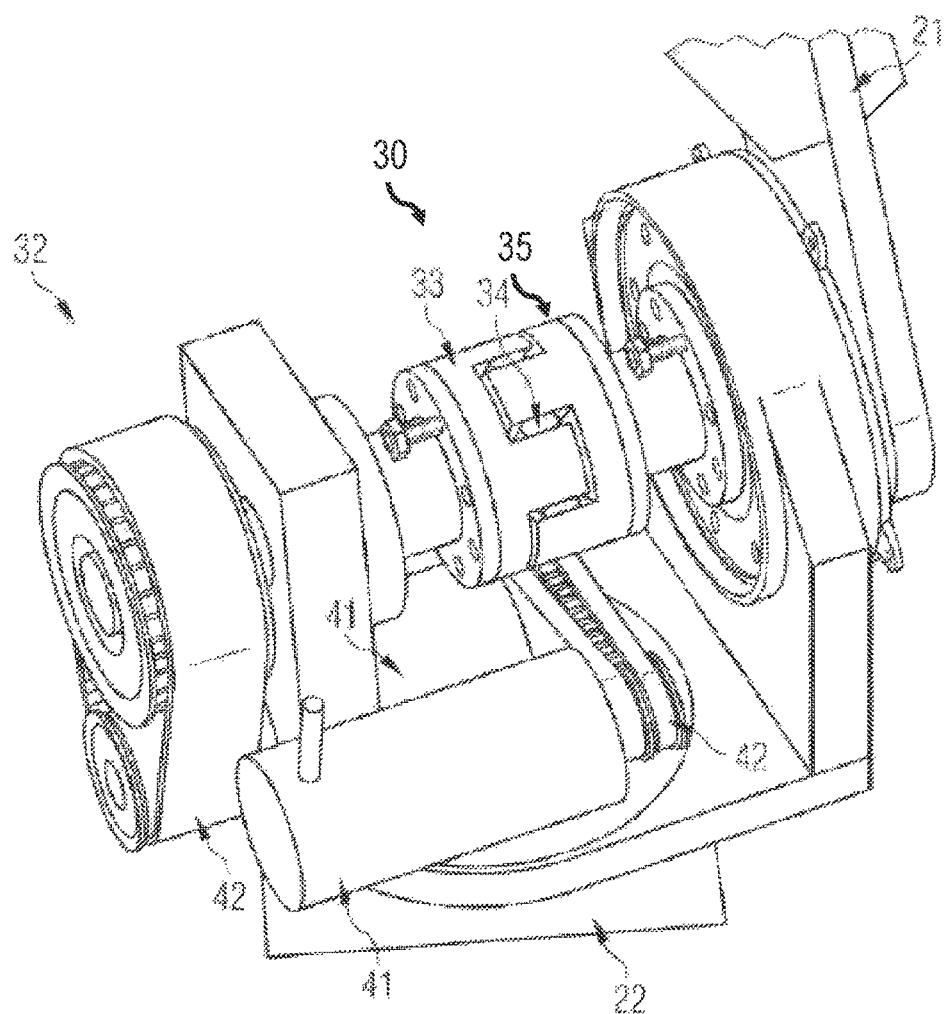
FIG. 2 shows a modification of the exemplary embodiment of the robot arm from FIG. 1.

FIG. 2 shows the modification of an exemplary embodiment of a robot arm from FIG. 1. As opposed to the exemplary embodiment in FIG. 1, in the exemplary embodiment of FIG. 2 the motor 41 is not rigidly arranged on the first arm segment 21, but is instead connected with the second arm segment 32. Thus the motor 41 does not move the first arm segment 21 "directly" over the coupling, but instead "indirectly" over a belt drive 42. The coupling element 30 is, in this case, a component of the belt drive 42. The design of the coupling element 30 and the sensor element 50 correspond to the exemplary embodiment of FIG. 1.

Figure 3:
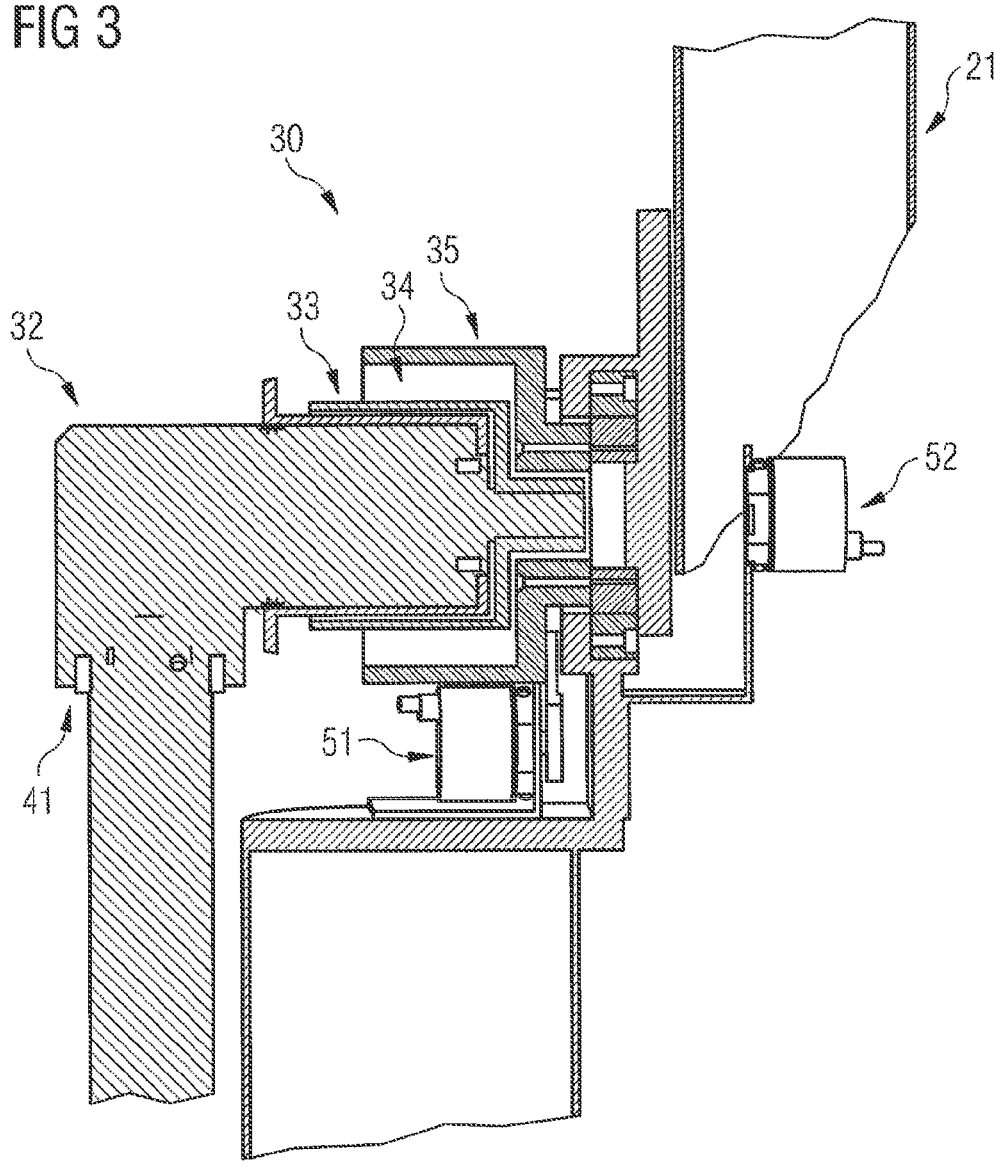
FIG. 3 shows an exemplary embodiment of a robot arm.

FIG. 3 shows a further exemplary embodiment of a robot arm. In this exemplary embodiment, the coupling segments 33, 35, i.e. the ends of the first arm segment 21 and of the second arm segment 32, are designed in cylinder form or like a sleeve. The first coupling segment 33 is created by the first sleeve and the second coupling element 35 is created by the second sleeve, whereby the first sleeve 33 has a smaller diameter than the second sleeve 35. The first sleeve 33 can therefore be inserted into the second sleeve 35. The two telescoped sleeves (coupling elements) form the coupling element 30 of the exemplary embodiment. Analogously to the preceding exemplary embodiments of FIGS. 1 and 2, the coupling elements (sleeves) 33, 35 are configured such that within the telescoped sleeves a free space is created, which is filled by the damping element 34. The first coupling element (the first sleeve) 33 is firmly connected with the motor 41 that is rigidly arranged on the first arm segment 21, whereas the second coupling segment (the second sleeve) 35 is firmly connected with the second arm segment 32. The damping element 34 between the two telescoped sleeves mechanically couples the first coupling segment 33 with the second coupling segment 35. In doing so it exhibits damping characteristics with regard to the transmission of the torque that are analogous to those of the damping element in the coupling element of the exemplary embodiment from FIG. 1. Materials that may be considered for the damping element 34 are, for example, elastomers such as PUR, PA, PEEK. The deformation of the damping material differs, however, from that of the exemplary embodiment in FIG. 1. FIG. 1 deals with a tension/pressure load, whereas the damping element in the exemplary embodiment of FIG. 3 is subject to a shearing load. Analogously to the preceding exemplary embodiments, the coupling element has a sensor element 50 that comprises a first sensor 51 and a second sensor 52, whereby the first sensor 51 is rigidly arranged on the first coupling segment 33 and the second sensor 52 is rigidly arranged on the second coupling segment 35. The sensors in this exemplary embodiment function in the same way as those in the preceding exemplary embodiments, namely by determining the relative position to each other and by outputting a representative sensor signal. Analogously to the preceding exemplary embodiments, the exemplary embodiment of FIG. 3 also has a control unit (not shown) which is configured to receive the sensor signal of the sensor element (s), to process the signal and to calculate the time derivative of the first and the second sensor in order to control the motor 41.

Figure 4:
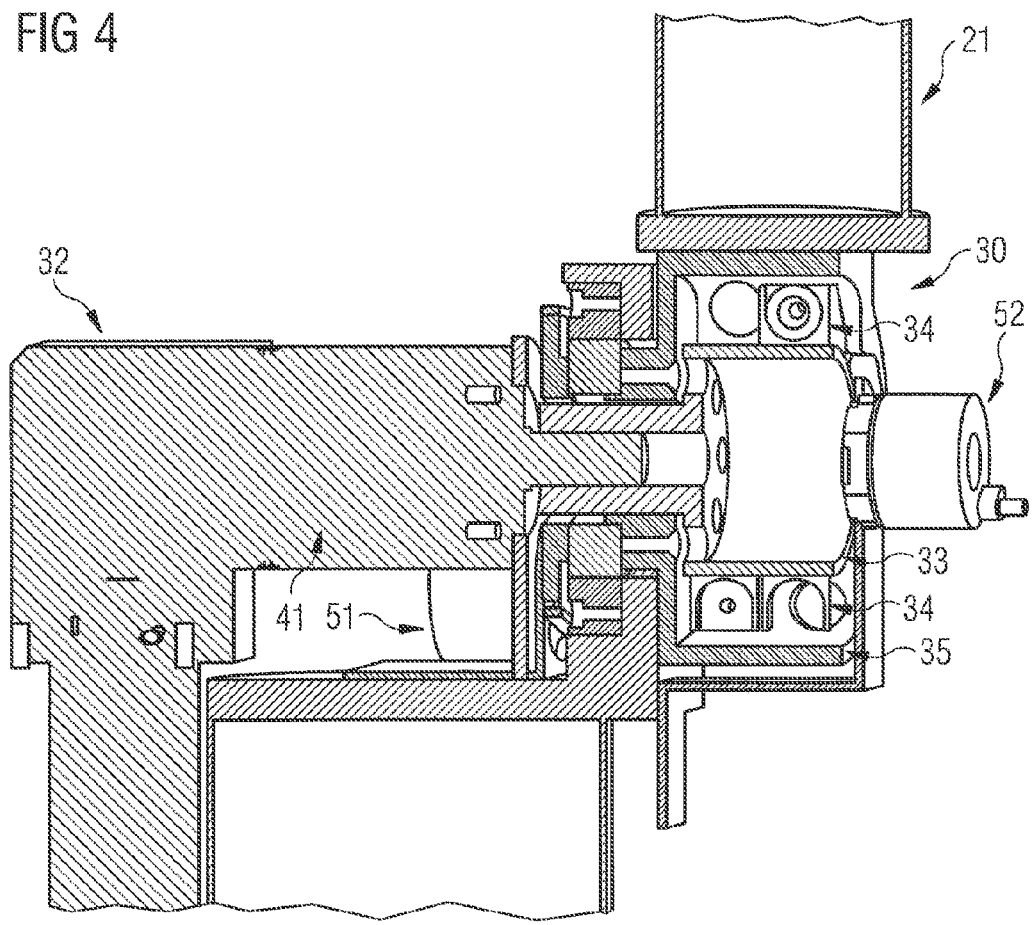
FIG. 4 shows a modification of the exemplary embodiment of a robot arm from FIG. 3.

FIG. 4 shows a modification of the exemplary embodiment of a robot arm from FIG. 3. As opposed to the exemplary embodiment in FIG. 3, the damping element 34 in the exemplary embodiment of FIG. 4 is created by one or more springs embedded in elastomer. These springs are arranged in the free space between the first and the second coupling elements 33, 35 such that a rotation of the two coupling elements toward each other compresses the springs. If the tension reaches a critical maximum value (springs completely compressed), the transmission of the torque continues directly as if no damping was taking place. Thus, the selective yielding capacity can also be achieved using springs and the corresponding damping material. The sensor technology and control is analogous to those of the exemplary embodiment from FIG. 3. A further mechanically producible selectivity of the reaction can be realized while using springs by connecting, one after the other, springs with different degrees of stiffness. In this manner, a specifically desired behavior can be achieved by means of a changeable characteristic curve encompassing the springs in their totality.

Figure 5:
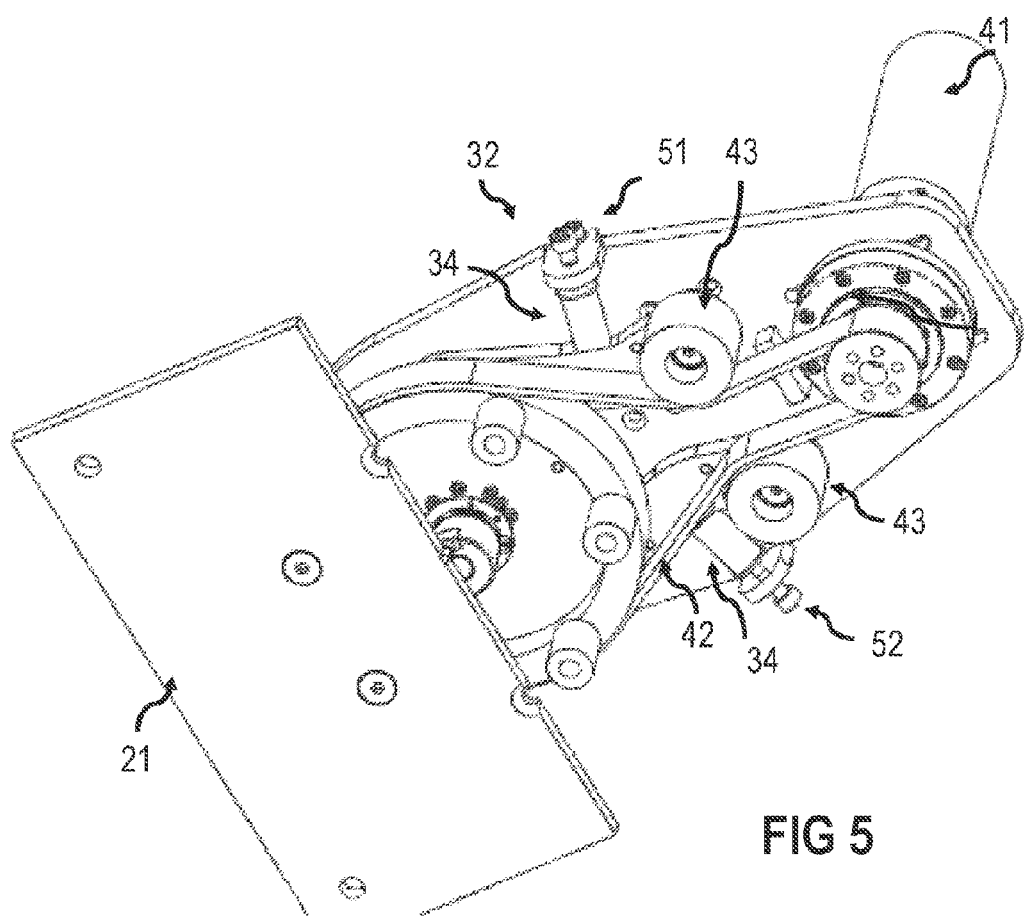
FIG. 5 shows a further exemplary embodiment of a robot arm.

FIG. 5 shows a further exemplary embodiment. The difference to the preceding exemplary embodiments consists in the fact that the damping element is no longer arranged between the two coupling segments of the arm segments.

Instead of this, in this exemplary embodiment the two arm segments are connected with each other by means of a belt 42. Here the motor 41 is still rigidly connected with an arm segment (segment 32). The belt 42 is tensioned by means of tensioning elements 43, in this exemplary embodiment— tension pulleys. Here the tensioning elements 43 of the belt 42 press against the spring damper elements 34. The functioning principle in this case is analogous to that of the preceding exemplary embodiments. When one arm segment is swung, a torque is applied to the motor 41, causing the belt 42 on one of the two tensioning elements 43 to be additionally tensioned and causing these tensioning elements 43 to be pressed outwards in the opposing direction to their original tensioning direction. This outward movement is accordingly damped by the damping elements 34 that are arranged behind the tensioning elements 43. At the same time, the relative angle of the tensioning elements 43 in relation to each other is measured by means of a sensor element, from which the effective torque can be calculated. When doing so, the expansion characteristics of the belt should be included into the calculation. In this case the sensor element comprises a first sensor 51 and a second sensor 52 that are arranged behind the damping elements 34.

Implementing a robot arm with electric motors as actuators has various advantages. Air muscles employed in the pneumatic solution exhibit undesirable and disadvantageous behavior when someone actively and strongly presses against the robot arm. Such an action produces excessive pressure in the air muscles and the robot snaps back in an uncontrolled manner when the applied force ceases (e.g. when it is abruptly released).

Due to safety measures, the controller only works slowly and is therefore not capable of absorbing this reaction of the robot arm. The electric drive solves this problem. The employed passive-soft elements of the transmission allow for only a few degrees of passive "dampening". The remaining yielding capacity originates in the controller (such control is also referred to as "impedance control"). Thanks to this, the undesired and uncontrolled reaction described above does not occur. This combination of "control-technological" yielding and passive yielding (by means of mechanical spring-damper elements) does not exhibit the above described disadvantages of the air muscle drive (or of bellows cylinders). Rapid applications of external force that cannot be compensated by the controller are absorbed by the spring-damper elements. Slow applications of external force (e.g. caused by interaction with a human user) are processed by the control technology, whereby virtually any force-deflection characteristic ("spring characteristic") can be set.

In addition, air muscles are only active in one direction, which is why they are always used as antagonists, i.e. a counterpart is always needed to generate force in the opposing direction. In the process, there is always the risk of a pulling element breaking. In such a case the counterpart would suddenly pull in the opposing direction with high momentum. In the case of the electric solution, a self-breaking transmission can be employed that mechanically prevents a movement as a protective measure against possible motor and/or control defects. Thus, the exemplary embodiments described here exhibit certain advantages over air muscle drives while avoiding some of their disadvantages.

When used for therapeutic purposes, the robot arm should, in general, respond to the reactions of the patient. This constitutes the main difference to typical rigid robots. What are being referred to here are "slow" processes. For example, the muscle of a patient is stretched to the extent of his/her pain threshold. In doing so, the arm of the patient is incrementally tensioned. In this situation, the use of air muscles proves to be disadvantageous, as these are characteristically too soft, as a result of which any movement of the patient's upper body (voluntary or involuntary) will produce undesired oscillations in the robot arm. The use of electric drives provides a solution for this problem as the controller can intervene much more directly and, due to the construction, only a few degrees of passive, and thus uncontrolled, yield is possible.

Various aspects of the embodiments described herein will now be summarized, whereby this should not be regarded as a complete list. A robot arm comprising, in accordance with one example embodiment, at least two segments (e.g. segment 21 and 32, see FIGS. 1 to 5). Both segments 21, 32 are swivably connected over a joint. One of the segments (e.g. segment 32 in FIG. 1) may be rigidly connected with a (e.g. stationary) base 22. As an alternative, more than two segments may be included. The two segments are mechanically coupled by means of a drive with an electromotor 41 such that the latter transmits to the joint a torque and the two segments 21 and 32 can tilt toward each other. The drive may also have a mechanical transmission and also comprise an elastic coupling arrangement 30. This comprises two coupling segments 33, 35 that are coupled by means of a damping element 34, allowing for the possibility of a relative movement between the two coupling elements. The coupling may also be realized as a belt drive with tension pulleys. The (damped) spring suspended tension pulleys allow the aforementioned relative movement.

The relative position (e.g. the angle of twist) of the two segments is measured and the measured values are fed into a control unit. The latter is configured to control the motor 41 such that the robot arm is moved into a desired position provided no external force is applied to the arm. In the event that an external force (disturbing force) is applied to the robot arm, the motor generates a counterforce dependent on the deviation between an actual position and a desired position in accordance with an adjustable force-deflection characteristic curve (the deflection being the deviation between desired and actual position).

The control unit can also determine the velocity with which the disturbing force is applied. If the relative position changes very rapidly (faster than a threshold value), then the disturbance is first absorbed by the spring damper element and the control unit can adapt the force-deflection characteristics. If the change in the relative position is too rapid, then, for example, a (very) flat force-deflection characteristic curve can be set so that the motor offers virtually no resistance to the disturbing force while still compensating the weight forces. If the relative position changes slowly (as compared to the time constants of the regulator implemented in the control unit), another force-deflection characteristic curve is employed. No absorption of the disturbance by the spring-damper element takes place (or only a minor absorption), as the yielding capacity of the robot arm is primarily determined by the controller.

Although the invention has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond— unless otherwise indicated—to any component or structure, which performs the specified function of the described component (e.g., that is functionally equivalent), even though not structurally equivalent to the disclosed structure, which performs the function in the herein illustrated exemplary implementations of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A robot, comprising:
    a robot arm comprising a first arm segment and a second arm segment;
    a motor configured to move the second arm segment relative to the first arm segment;
    a yielding element configured to mechanically couple the first arm segment and the second arm segment;
    a sensor configured to determine a relative position of the first arm segment in relation to the second arm segment and to output a position sensor signal representing the relative position; and
    a control unit configured to receive the position sensor signal and to control the motor in accordance with the position sensor signal,
    wherein the control unit is further configured to control the motor to move the first arm segment into a desired relative position in relation to the second arm segment, when no external force is applied to the robot arm, and when an external force is applied to the robot arm, the motor generates a counterforce which depends on the deviation between the actual position and the desired position, and
    wherein the control unit has a predetermined time constant, wherein changes in the external force, which are rapid as compared to the time constant, are substantially absorbed by damping elements coupled between the first arm segment and the second arm segment.

2. The robot of claim 1, wherein the counterforce depends on the strength of the external force as well as on the magnitude of its change.

3. The robot of claim 1, wherein the control unit is configured to determine a change in the relative position and/or the external force and to select, in dependence thereon, a characteristic curve characterizing the correlation between counterforce and deviation between actual relative position and desired relative position.

4. The robot of claim 3, wherein the characteristic curve is flat so that substantially no counterforce is generated when at least one of, the external force and its change, exceeds respective predetermined thresholds.

5. The robot of claim 1, wherein the yielding element comprises an elastomer.

6. The robot of claim 1, wherein the yielding element comprises one or more springs embedded in an elastomer.

7. The robot of claim 1, wherein the first arm segment and the second arm segment each comprises an end portion, wherein the end portions are, when inserted one into the other, mechanically coupled with each other by the yielding element, and wherein the first arm segment has a smaller diameter than the second arm segment.

8. The robot of claim 1, wherein the motor is arranged on the first arm segment and is configured to move the second arm segment by means of a coupling, and wherein the yielding element is arranged between two coupling elements of the coupling.

9. The robot of claim 1, wherein the yielding element is formed by a belt tensioned over one or more tension pulleys.

10. The robot of claim 1, wherein the control unit comprises a regulator having a predetermined time constant, so that changes in the external force, which are rapid as compared to the time constant, are substantially absorbed by the yielding element.

11. The robot of claim 1, wherein a yielding capacity of the robot arm is primarily determined by a regulator included in the control unit, when changes in the external force are slow, and wherein the regulator is configured to apply a force-deflection characteristic curve.

12. A method for controlling a robot arm composed of a first arm segment and a second arm segment, the method comprising:
    determining a relative position of the first arm segment in relation to the second arm segment; and
    controlling the relative position of the first arm segment in relation to the second arm segment, by moving the first arm segment into a desired relative position when no external force is applied to the robot arm and to by generating a counterforce which depends on the deviation between a currently determined position and a desired position, when an external force is applied to the robot arm,
    wherein controlling the relative position is done with a pre-determined time constant, wherein changes in the external force, which are rapid as compared to the time constant, are substantially absorbed by damping elements coupled between the first arm segment and the second arm segment.

* * * * *